Patented Nov. 26, 1929

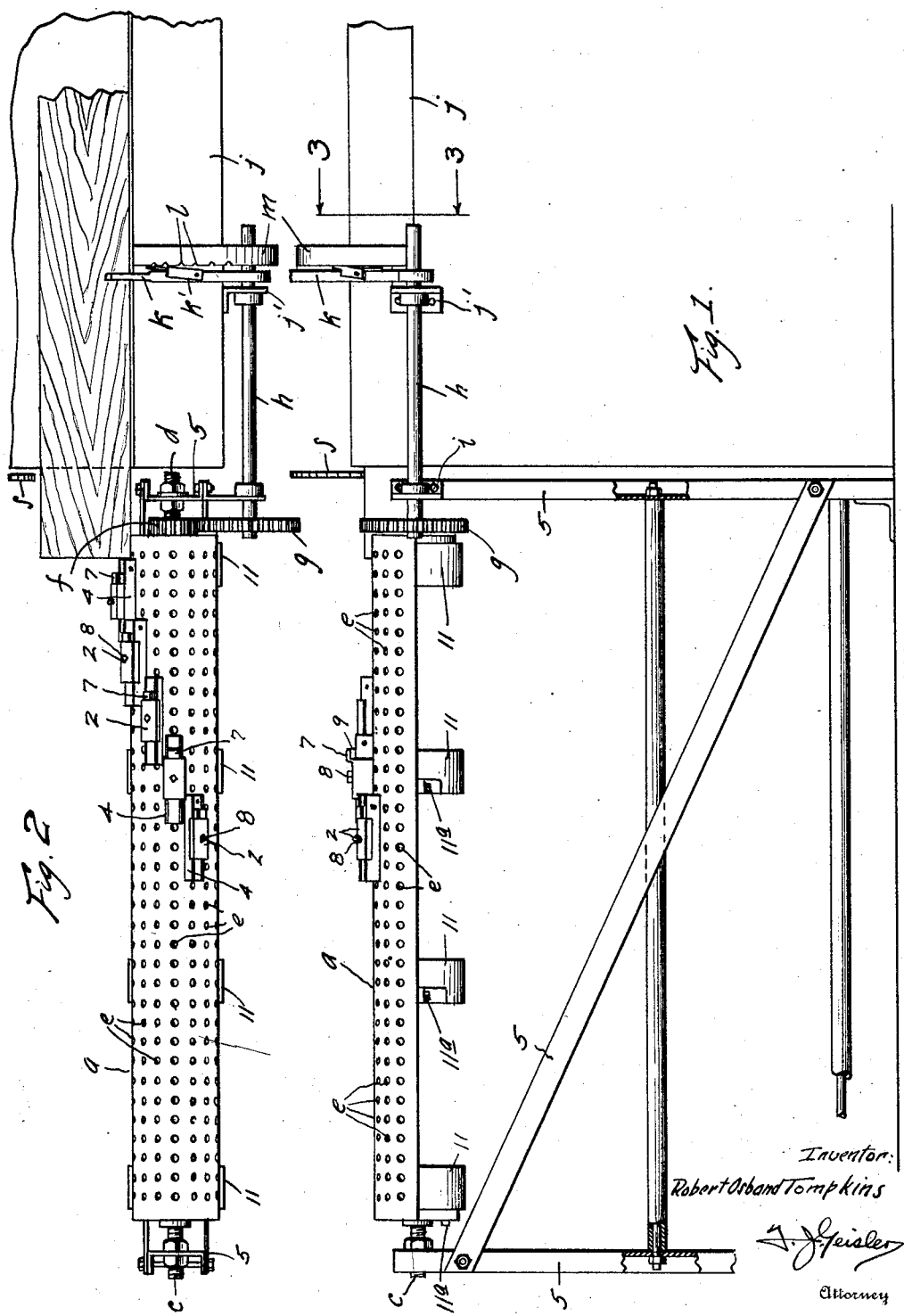

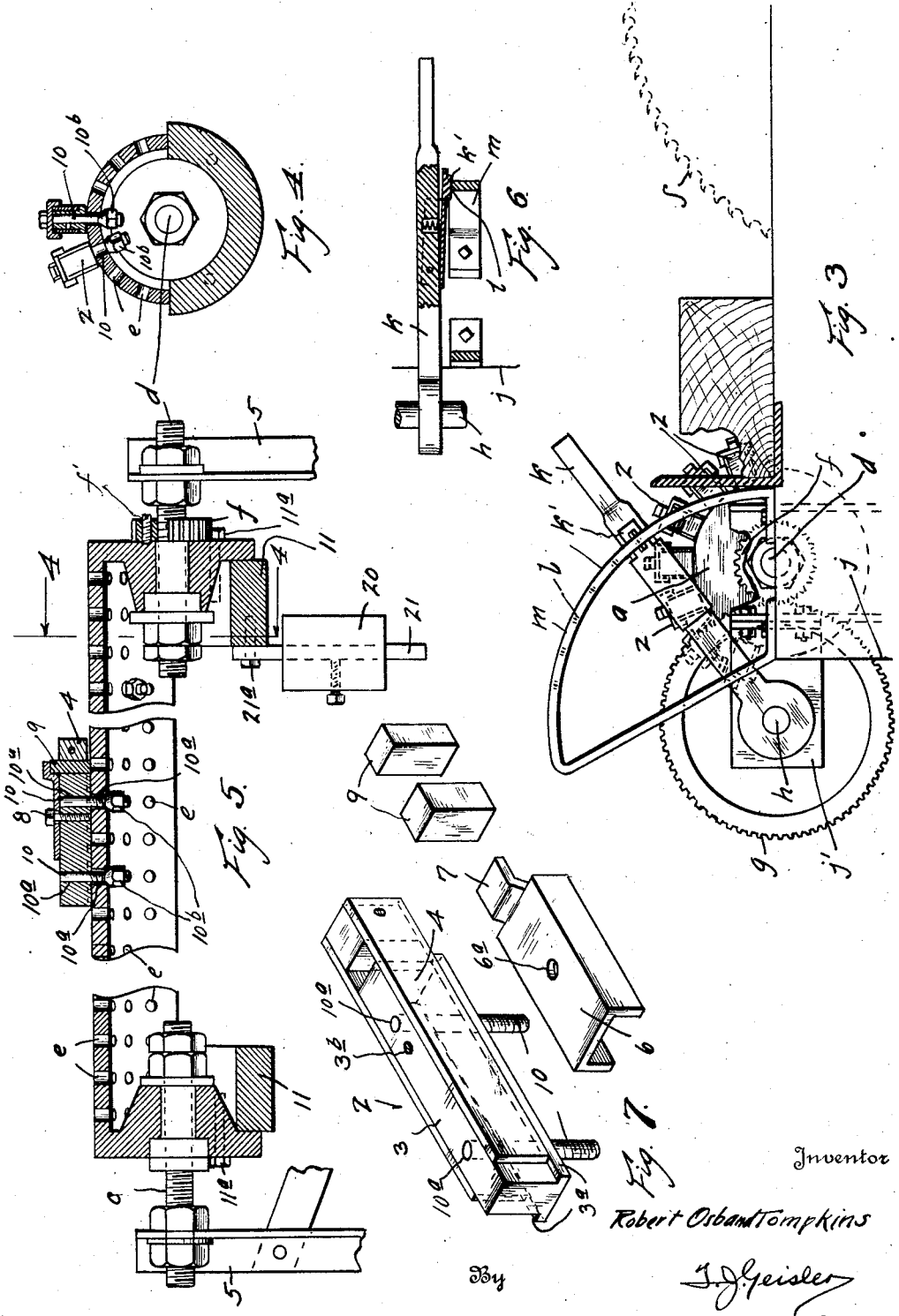

1,737,131

UNITED STATES PATENT OFFICE

ROBERT OSBAND TOMPKINS, OF KLAMATH FALLS, OREGON

SAW-TABLE GAUGE

Application filed September 27, 1927. Serial No. 222,337.

My invention relates to a saw table gauge used in connection with the saw tables of automatic sliding or swinging cut-off saws. In saw mills, and particularly planing mills, the so-called cut-off table is arranged adjacent to and transversely of the cut-off saws, and the pieces of lumber to be cut off are moved longitudinally onto this table until one end abuts against a stop arranged at the opposite end of the table from which the lumber is received. The cut-off saw is then moved by suitable means against the lumber which is cut to the length determined by the position of the stop.

In these mills it is often desirable to cut the pieces of lumber to exact lengths, within a fraction of an inch. The means, as heretofore provided, for gauging the lengths of the pieces of lumber to be cut were inefficient, because they did not provide for adjustments by which the lumber could be cut in lengths measured to fractions of an inch.

The principal object of my invention is to provide a simple and efficient saw table gauge comprising a series of stops, individually adjustable for cutting predetermined lengths of lumber in dimensions comprising a fraction of an inch.

Another object of my invention is to provide simple and convenient means for quickly bringing a selected stop of the series into operative position on the table without interfering with the adjustment of the remaining stops of the series, and without interrupting the work of cutting off the lengths of lumber, while such selections are being made.

I attain my objects in a saw table gauge comprising a rotatable member, provided with a series of adjustable stops, provided with means for extending one end thereof, whereby minor adjustments for the lengths of the pieces of lumber to be cut may be made to, relatively, fractions of an inch, and means for rotating the said rotatable member, to bring the selected stop into operative position.

These and the incidental features of my invention, and the details of construction thereof are hereinafter described with reference to the accompanying drawings:

In the drawings:

Fig. 1 shows a side elevation of my saw table gauge and illustrates the relative positions of the saw table and the cut-off saw;

Fig. 2 shows a plan view of my invention and illustrates further details of construction;

Fig. 3 shows a section taken on the line 3—3 of Fig. 1, looking in the direction of the arrows, and illustrates the details of construction of the operating means and the relative arrangement of the stops;

Fig. 4 shows a section taken on the line 4—4 of Fig. 5, looking in the direction of the arrows and illustrates the counter-weights provided on the rotatable member;

Fig. 5 shows a fragmentary central longitudinal section of my saw table gauge and illustrates further details of construction;

Fig. 6 shows a fragmentary view of the operating handle, and illustrates partly in section the spring seated pawl provided thereon; and Fig. 7 shows a perspective view of one of the stops disassembled into its various parts.

My saw table gauge comprises a semi-cylindrical member $a$ arranged adjacent the saw $s$ in alinement with the saw table $j$, and journaled at each end on stub shafts $c$ and $d$, which are fixed on a supporting frame 5.

The member $a$ is provided with radially arranged spaced holes $e$, and a pinion gear $f$ is loosely mounted over the stub shaft $d$ and fixed to the end of the member $a$ by screws $f'$. The pinion $f$ meshes with a gear $g$ which is fixed on a shaft $h$ supported on the frame 5 as at $i$ and on the cut-off table $j$ as at $j'$.

To the other end of the shaft $h$ is fixed a hand lever $k$. On the hand lever $k$ is provided a spring seated pawl $k'$ which engages notches $l$ in an arc segment $m$, which is also supported on the table $j$. The notches $l$ are of such shape that the pawl $k'$ will be forced in and out of them by a relatively light pressure.

The stops 2, Fig. 7, comprise an oblong block 3 provided with laterally projecting shoulders $3^a$ on the lower edge, a U-shaped member 4 adapted to seat on the shoulders 3ª over the block 3, and a channel plate 6 provided with a projection 7 at one end. Holes 3ᵇ and 6ª are provided in the block 3 and channel plate 6, respectively, in which a retaining bolt 8 is inserted, Fig. 5.

Spacer plugs 9 of various thicknesses are adapted to be inserted between the enclosed end of the U-shaped member 4 and the block 3.

Stud bolts 10 are threaded into holes 10ª in the block 3 and are adapted to extend through the holes $e$ in the member $a$ and to be secured thereon by nuts 10ᵇ.

Counter-balances 11 semi-circular in shape are fixed to the under portion of the member $a$ by bolts 11ª.

In the operation of my device a number of the stops 2 will be bolted on the member $a$ in "echelon" or parallel offset relation as shown in Figs. 1, 2 and 5, by the bolts 10 in the holes $e$, at predetermined distances from the saw $s$, to correspond to the lengths of the pieces of lumber to be cut, for instance, for a particular order of a number of different lengths of lumber.

The selected stop which is to be used will be brought into operative position, that is, in alinement with the saw table $j$ by rotating the member $a$ by the lever $k$, the remaining stops being out of alinement with the saw table. The change from one stop to the other is quickly and easily made with the handle $k$, the pawl $k'$ being operable by a light pressure.

When the lumber is being cut in lengths of feet and inches, the stops will be bolted in the desired holes and used without the spacer plugs 9, but when the lumber is to be cut in fractions of an inch, the U-shaped member 4 will be extended and a spacer plug 9 of the desired thickness, e. g. one-half inch, will be inserted, and the stop will then be bolted in the holes which are one space further from the saw, the channel plate 6 preventing the plugs from falling out when a particular stop is not in use.

The counter-weights 11 are fixed on the underside of the member $a$ to counter-balance the weight of the stops 2, in order that the member $a$ may be easily rotated and set at the desired position.

In Fig. 5 I show another means for counter-balancing the weight of the stops, such as a weight 20 secured on an arm 21 which is secured by bolts 21ª to the counter-weight 11 at the end of the member $a$, the intermediate counter-weights being in this case removed.

By this construction, and arrangement, I have provided a saw table gauge which may be easily set for cutting pieces of lumber at any desired length and which may be efficiently and easily operated by an attendant.

I claim:

1. In a saw table gauge of the character described, an elongate rotatable member, a longitudinally adjustable stop carried by said member, means for rotating said rotatable member, and means for counter-balancing the weight of said stop.

2. In a saw table gauge of the character described, an elongate counterbalanced rotatable member provided with a parallel, longitudinally arranged series of spaced holes, an adjustable stop, bolts inserted in said holes removably securing the stop in place, and means for rotating said rotatable member.

3. In a saw table gauge of the character described, a rotatable member, a series of adjustable stops movably carried on the circumference of said rotatable member, said stops comprising a block and means for extending one end thereof, and means for rotating said rotatable member.

4. In a saw table gauge of the character described, a rotatable member, a series of adjustable stops movably carried on the circumference of said rotatable member, said stops comprising a block and means for extending one end thereof, the latter means consisting of a member longitudinally slidable on said block, having a transverse section located opposite one end of the block, a series of spacer plugs of different dimensions respectively, insertable in the space between said transverse section of the member and the adjacent block end, and means for securing the spacer plugs in place.

5. In a saw table gauge of the character described, a rotatable member, a series of adjustable stops movably carried on the circumference of said rotatable member, said stops comprising a block and means for extending one end thereof, the latter means consisting of a U-shaped member longitudinally slidable on said block, having a transverse section located opposite one end of the block, a series of spacer plugs of different dimensions respectively, insertable in the space between said transverse section of the U-shaped member and the adjacent block end, and means for securing the spacer plugs in place.

6. In a saw table gauge of the character described, a rotatable member, a series of adjustable stops movably carried on the circumference of said rotatable member, said stops comprising a block and means for extending one end thereof, the latter means consisting of a U-shaped member longitudinally slidable on said block, having a transverse section located opposite one end of the block, a series of spacer plugs of different dimensions respectively, insertable in the space between said transverse section of the U-shaped member and the adjacent block end, and a retaining plate removably secured on the block projecting over the inserted spacer plug.

7. In a saw table gauge of the character described, a rotatable member provided with a series of spaced holes, an adjustable stop, bolts inserted in said holes removably securing the stop in place, said stop comprising a block and means for extending one end thereof, and means for rotating said rotatable member.

8. In a saw table gauge of the character described, a rotatable member provided with a series of spaced holes, an adjustable stop, bolts inserted in said holes removably securing the stop in place, said stop comprising a block and means for extending one end thereof, means for rotating said rotatable member, and means for counter-balancing the weight of said stop.

ROBERT OSBAND TOMPKINS.